H. L. BEACH.
CONTROLLER FOR ELECTRIC MOTORS.
APPLICATION FILED FEB. 10, 1909.

969,513.

Patented Sept. 6, 1910.
5 SHEETS—SHEET 1.

Fig. 1.

WITNESSES:
Fred H. Miller

INVENTOR
Howard L. Beach
BY
Wesley G. Carr
ATTORNEY

H. L. BEACH.
CONTROLLER FOR ELECTRIC MOTORS.
APPLICATION FILED FEB. 10, 1909.

969,513.

Patented Sept. 6, 1910.

WITNESSES:

INVENTOR
Howard L. Beach
BY
ATTORNEY

H. L. BEACH.
CONTROLLER FOR ELECTRIC MOTORS.
APPLICATION FILED FEB. 10, 1909.

969,513.

Patented Sept. 6, 1910.

Fig. 13.

H. L. BEACH.
CONTROLLER FOR ELECTRIC MOTORS.
APPLICATION FILED FEB. 10, 1909.

969,513.

Patented Sept. 6, 1910.

WITNESSES:
Fred H. Miller

INVENTOR
Howard L. Beach
BY
Wesley S. Carr
ATTORNEY

UNITED STATES PATENT OFFICE.

HOWARD L. BEACH, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

969,513.  Specification of Letters Patent.  Patented Sept. 6, 1910.

Application filed February 10, 1909. Serial No. 477,169.

*To all whom it may concern:*

Be it known that I, HOWARD L. BEACH, a citizen of the United States, and a resident of Wilkinsburg, in the county of Allegheny and State of Pennsylvania, have invented a new and useful Improvement in Controllers for Electric Motors, of which the following is a specification.

My invention relates to controllers for electric motors and it has special reference to devices of this character which are adapted for use on electric vehicles.

The object of my invention is to provide a simple controller having a single operating handle by which an electric motor may be accelerated and controlled in either direction of motor rotation and operated as a generator for braking purposes.

It is my aim to provide a controller which shall be complete in every detail and yet occupy a minimum amount of space and in which, for the convenience of the operator, a relatively short movement of the controller handle is capable of effecting a relatively wide adjustment of the controller drum.

Numerous other improvements will be hereinafter pointed out, which render my device particularly well adapted to the service for which it is intended.

One of the principal advantages of my controller is due to the fact that the motor circuit is never interrupted except when the cut-out switch or the motor-accelerating switch is moved into its off position; i. e. the various circuit arrangements for accelerating the motor are successively effected without breaking the circuit, as the change is being made from one to another.

Figs. 3, 4, 5, 6, 7, 8, 9, 10, 11 and 12 are detail views of the controller shown in Figs. 1 and 2.

Referring to Figs. 1 to 12, inclusive, of the drawings, the device illustrated comprises a stationary frame 1 having end brackets 2 and 3, a control switch drum 4 and a cut-out switch drum 5 which are mounted in alinement with each other on the same shaft 6, a plurality of stationary contact fingers 7 and 8 and an operating mechanism 9.

Figure 1:
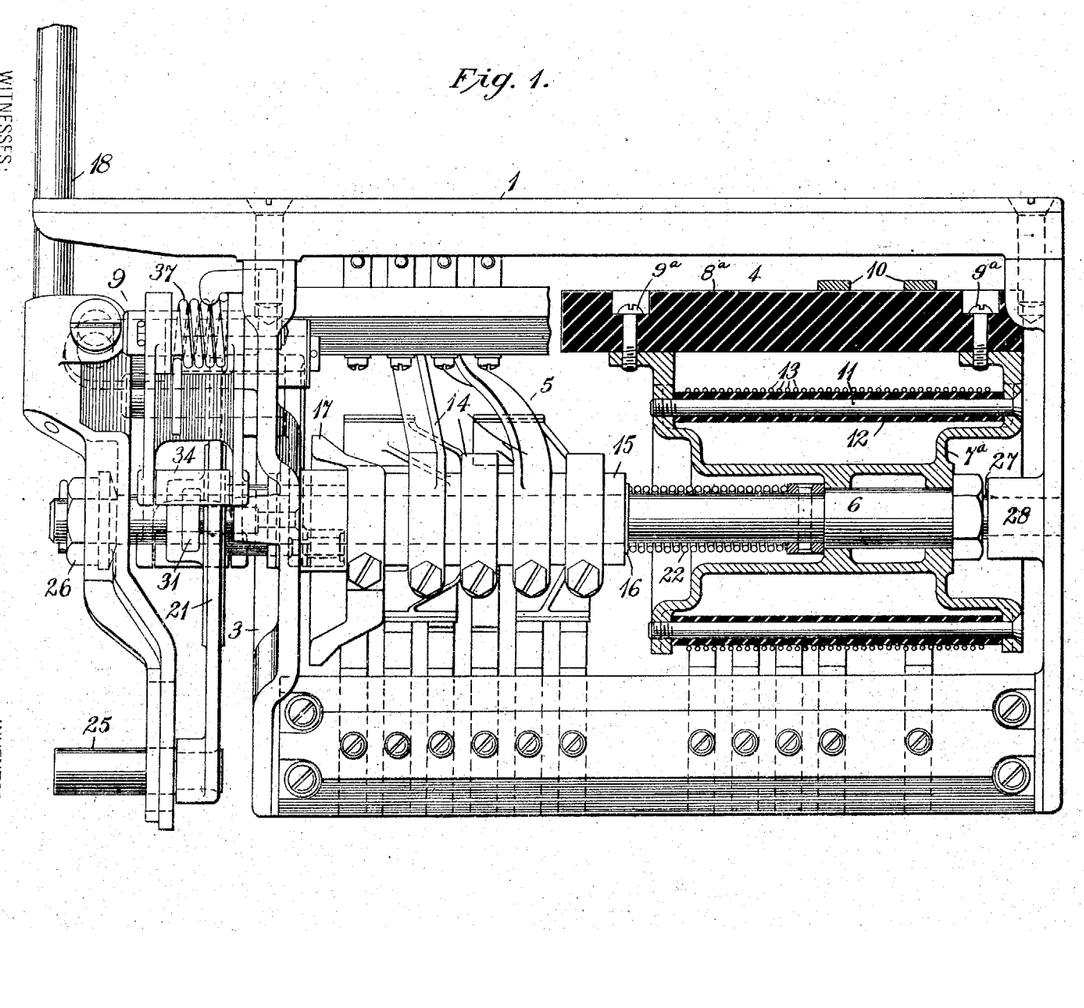
Figure 1 of the accompanying drawings is a longitudinal elevation and Fig. 2 an end elevation of a controller constructed in accordance with my invention.
Figures 2, 3, 4, 5, 6:
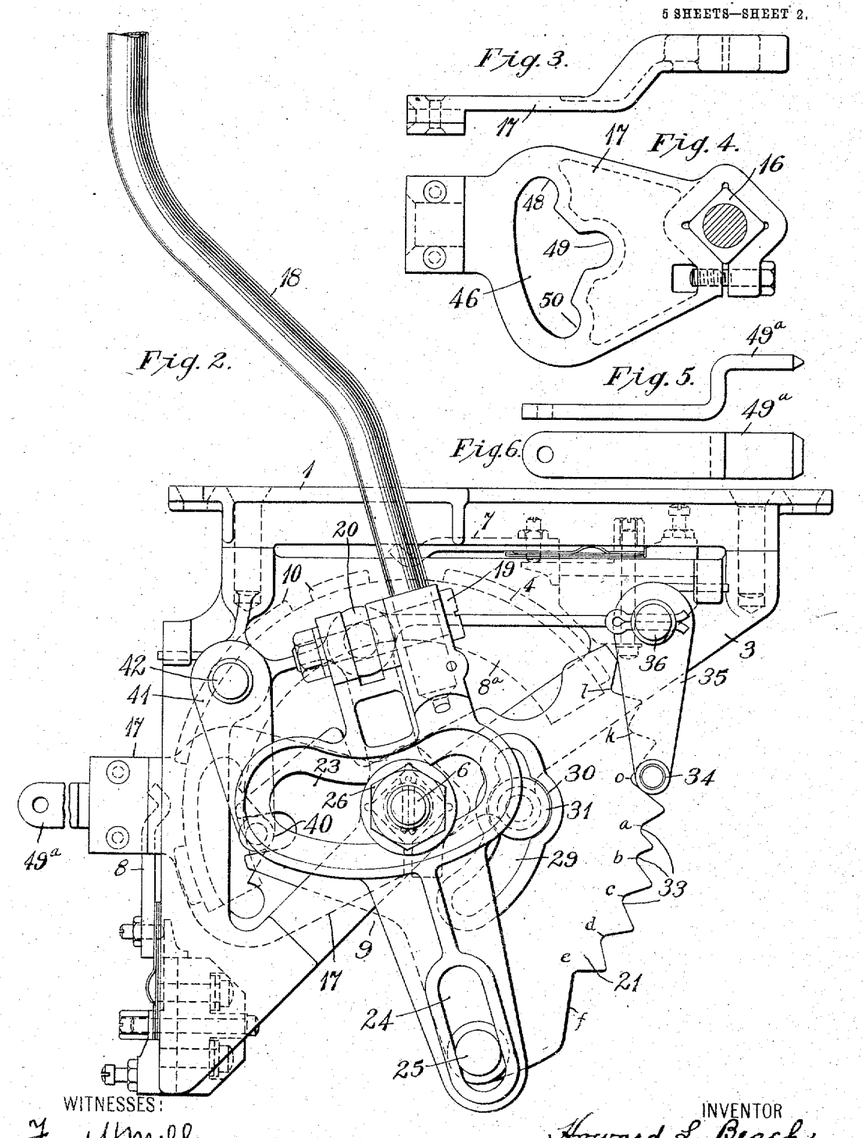
Figures 7, 8, 9, 10, 11:
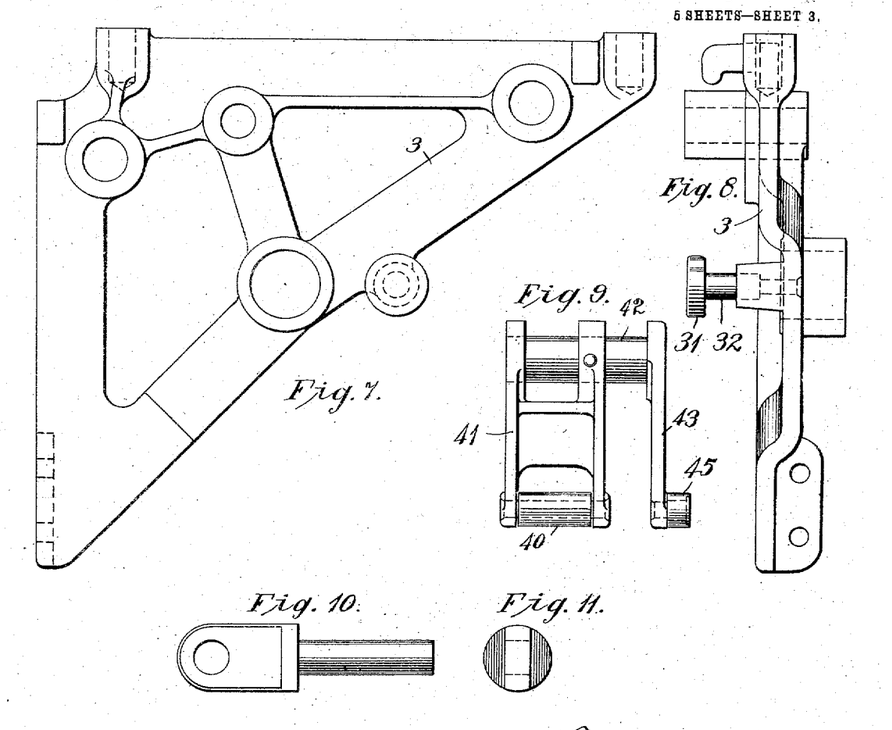
Figure 12:
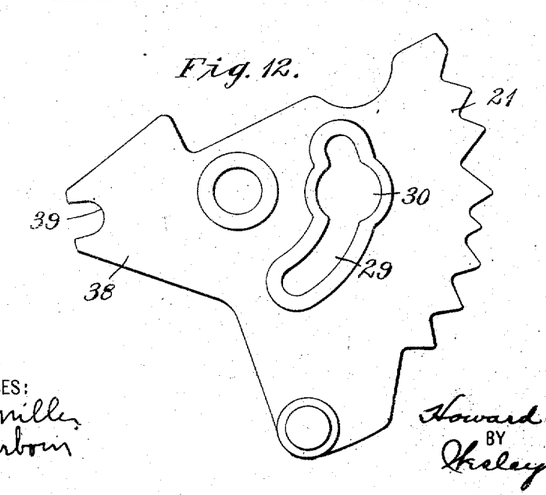

The control switch drum 4 comprises a frame or spider 7$^a$ which is secured to the shaft 6, an insulating drum segment 8$^a$ which is secured to the spider 7$^a$ by screws 9$^a$, contact ring segments 10 mounted on the segment 8$^a$ and longitudinal rods or bars 11 which are supported by the spider in substantially parallel relation to the shaft 6. The rods 11 are covered by insulating tubes 12 and are symmetrically arranged about the shaft 6 to support a plurality of convolutions of resistance conductor 13, which are wound thereon in the form of a helix. The contact-ring segments 10 are engaged by the stationary contact fingers 7 and 8.

It will be readily understood by those skilled in the art that the total number of contact fingers required may be materially reduced by reason of the fact that the resistance or resistances 13 are so mounted on the rotatable drum member that they may be connected directly and permanently to the contact-ring segments on the surface of the drum.

The cut-out switch drum 5 comprises a plurality of metal rings 14, having contact-bearing arms projecting outwardly therefrom, which are clamped to a bushing 16 and are insulated therefrom by a sleeve 15, the bushing being rotatably mounted on the shaft 6 and the structure constituting what is known as a metal drum. The insulating sleeve 15 surrounds a metal bushing 16 which is mounted on the shaft 6 and is provided with a square end, adjacent to the bracket 3, to which an interlocking cam 17 is secured.

The operating mechanism 9 comprises a handle lever 18 which is so fulcrumed at a point 19 and on a stud 20 that it is permitted to rotate in planes at substantially right angles to each other, and a cam 21, which is keyed to the drum shaft 6 between the bracket 3 and the outer extremity of the shaft. A spring 22 is coiled about the shaft 6 and is interposed between the drum 4 and the bushing 16 of the drum 5 to normally hold the drum 4 and the shaft 6 in such positions that the operation of the drum will effect that rotation of the motor which produces a forward motion of the vehicle. Rotative movement of the drum is effected by the handle lever 18 which is provided with a slot 23, through which the end of the shaft 6 extends, and a slot 24 that engages a pin 25 extending laterally outward from the cam 21. The outer end of the shaft 6 is provided with a nut or enlargement 26 in order that a suitable motion of the handle lever shall produce a longitudinal adjustment of the drum 4 and of the shaft 6 relative to the drum 5 and to the stationary frame 1. Since the cam 21 is secured to the shaft 6, it also moves with the shaft in opposition to the spring 22. The longitudinal adjustment of the shaft is limited, in one direction, by a shoulder 27 which engages a bearing block 28 of the bracket 2 and by a similar shoulder at the other end of the shaft. The cam 21 is provided with a slot 29, having an enlargement 30 through which the head 31 of a stationary stud 32 may project. The stud 31 is secured to the stationary bracket 3 and projects outwardly therefrom. The slot 29 of the cam 21 is in the form of an arc which is concentric with the shaft 6, and the arrangement of parts is such that the cam is free to rotate through predetermined angles from the off position of the drum, when the drum occupies either of its extreme positions of longitudinal adjustment. The head 31 of the stud 32 is adapted to pass freely through the enlargement 30 when the drum is in its off position, but prevents the longitudinal adjustment of the drum in any other position. The slots 23 and 24 in the handle lever are essential in order to provide an operative connection between the lever and the cam 21, since their centers of rotation are separated and since it is desirable to effect the aforesaid longitudinal adjustment, as well as a rotative movement, of the drum by means of the same handle. The periphery of the cam 21 is provided with a plurality of notches 33 which are engaged, in the usual manner, by means of a roller 34 which is mounted at the extremity of a two part pawl 35 fulcrumed on a stationary shaft 36, the roller 34 being held in engagement with the periphery of the cam by means of a spring 37. The roller 34 is of sufficient length to engage the pawl with equal facility, irrespective of the position occupied by the shaft 6 and the cam.

The cam 21 is provided with a projection 38 having a notch 39 which is engaged by a roller 40 on a pawl 41, when the drum occupies its off position. The pawl 41 is similar to the pawl 35 and is rotatably mounted upon a shaft 42. The pawl 41 is associated with, and operatively connected to, a pawl 43 which is attached to the shaft 42 but is located inside of the bracket 3 instead of outside of it, as is the pawl 41.

The pawl 43 is provided with a roller 45 that projects into a recess 46 in the interlocking cam 17 which is provided with accentuating notches 48, 49 and 50. The arrangement of parts is such that if the cam 17 occupies its off position it is locked unless the drum 4 and the cam 21 occupy their off positions. Furthermore, it is only possible to rotate the drum 4 and the cam 21 when the drum 5 and the cam 17 occupy their operating or battery-charging positions. Consequently, it is impossible to supply power to the motor by means of the lever 49$^a$ which is attached to the cam 17, but the circuit may be interrupted by this means. The resistance-controlling drum may be adjusted, however, for purposes of inspection and repairs, while the batteries are being charged. The notch 39 in the cam 21 and the notch 49 in the cam 17 are so proportioned in depth that when the roller 40 engages notch 39 the position of cam 17 is accentuated but the cam is not locked and the notches 48 and 50 are adapted, when engaged by the roller 45, to raise the pawls 43 and 41 still farther so that the position of cam 21 is accentuated but not locked.

The operation of the controller is as follows: Assuming that the parts occupy positions as shown in Figs. 1 and 2, if the handle lever 18 is moved in a counter-clockwise direction, in a plane perpendicular to the axis of the drum, the drum 4, the shaft 6 and the cam 21 will be moved about the axis of the drum through an angle which is materially greater than that traversed by the handle lever, and the roller 34 of the pawl 35 will be moved successively into engagement with cam notches $a$, $b$, $c$, $d$ and $e$. These positions of the drum are adapted to effect the acceleration of the motor controlled by it. A fifth motor-accelerating position is provided but is not accentuated as are the others, the roller 34 moving along the surface $f$ of the cam as this position is approached. The spring 37 tends to return the drum to the position $e$, since the position $f$ is a weak-field, high-speed motor-operating position, as hereinafter explained, and is not intended for constant use. The arrangement of parts just referred to is therefore employed in order to force the vehicle driver to exert a positive force on the control handle when operating at this speed. If the handle lever is moved in a clockwise direction, until the roller 34 engages, successively, cam notches $k$ and $l$, the maximum rotative adjustment of the drum is effected, the last two positions being adapted to arrange the circuit connections for regenerative braking. If the drum is now returned to its off position, as shown in the drawings, in which the roller 34 engages a notch $o$, and the handle lever is moved to the left in Fig. 1, the drum 4 and the shaft 6 will be longitudinally adjusted and the cam 21 will be so moved that the head 31 of the stud 32 will pass through the enlargement 30 in the cam slot 29. Under these conditions, the spring 22 tends to return the drum 4 longitudinally to the position shown in the drawings, but, if the handle lever is now moved in a counter-clockwise direction, the roller 34 will still engage the notches $a$, $b$, $c$, $d$ and $e$ successively, but the shifting of the drum 4 relative to the stationary fingers 7 and 8 will serve to adjust the motor circuit connections for reverse rotation. It will thus be observed that the same convenience of service is secured for either direction of motor rotation.

The position of the drum 5 is only changed when it is desired either to open the motor circuit entirely or to connect the storage batteries with which the vehicle is provided to the charging plug.

A further advantage in the interlocking mechanism, by which the accelerating and the control switches are associated, is secured in the operation of the controller, since the cut-out switch drum 5 may be thrown from either of its positions Y and Z into its off position X, irrespective of the position occupied by the accelerating switch 4, but it may not be moved from its position X to the positions Y and Z unless the accelerating switch occupies its off position. For example, in case the accelerating switch sticks or becomes locked in some intermediate position, it is possible to immediately interrupt the motor circuit by means of the cut-out switch and it is then impossible to complete the motor circuits until the accelerating switch has been repaired and returned to its off position. This is evident from the contour of the notches in the cam 17, which are of unequal depth, as already described.

Reference may now be had to Figs. 13 to 21, inclusive, in which the controller shown in Figs. 1 to 12 is developed into a single plane and is embodied in a system of control comprising an electric motor having an armature 61 and field magnet windings 62 and 63, storage batteries 66 and 67 and the controller, just referred to, which comprises cut-out switch 64 and an accelerating switch 65. The reversal of the motor is effected by a longitudinal movement of the contact-bearing drum of the accelerating switch, and resistance sections 68, 69 and 70 are operatively connected to the contact drum and are electrically connected to the contact segments for the purpose of simplifying the controller and reducing the number of stationary contact fingers, as will appear from the detailed description of the circuit connections hereinafter set forth.

Figure 13:
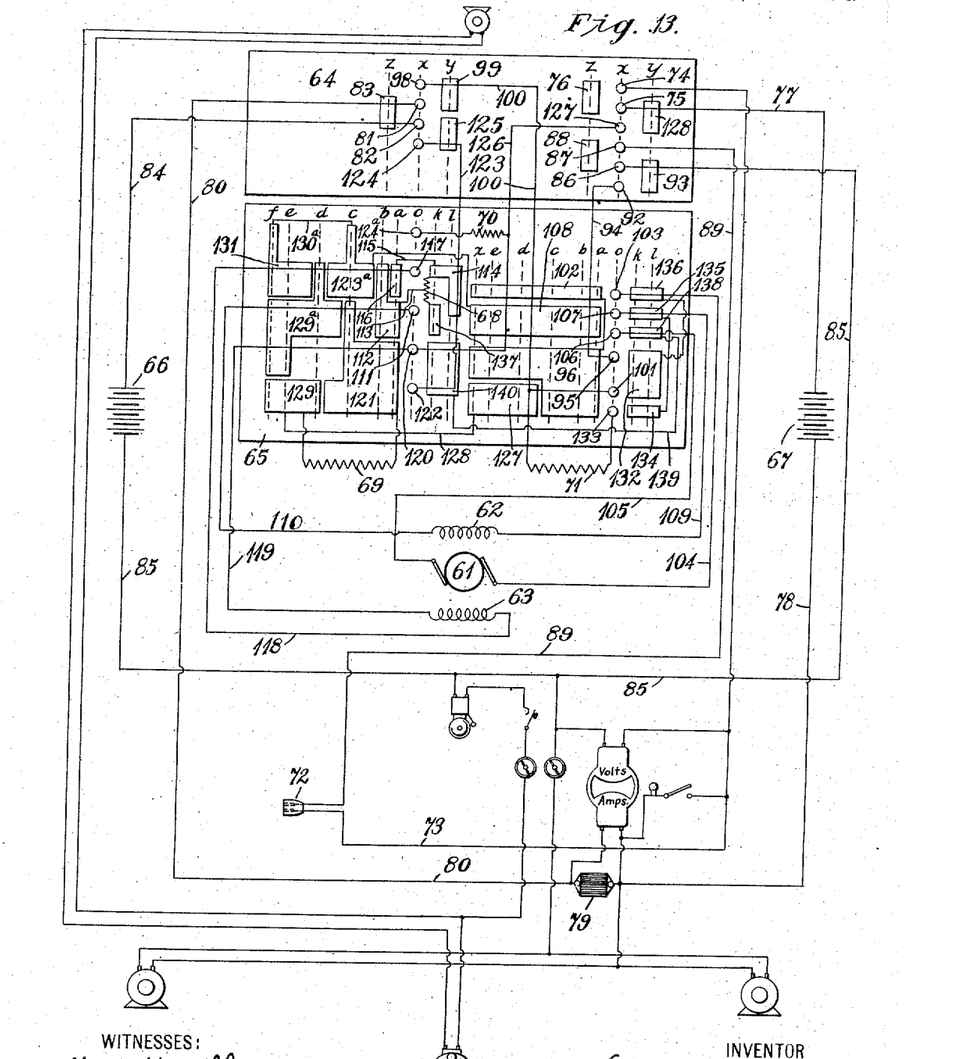
Fig. 13 is a diagrammatic view of the circuit connections for a system of vehicle control embodying my invention, and Figs. 14 to 21, inclusive, are simple diagrams showing the relations between the principal elements of the system in each of the positions of the controller.
Figure 14:
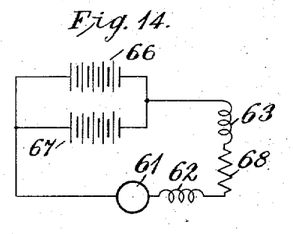
Figure 15:
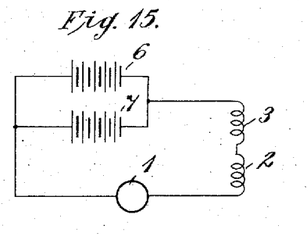
Figure 16:
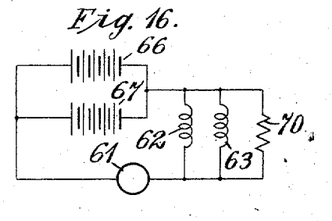

The cut-out switch 64 is provided with an off position X, a motor-running position Y and a battery-charging position Z. When the switch occupies its battery-charging position, the batteries are connected to a charging receptacle 72 through which suitable line connections may be effected. When the cut-out switch 64 occupies its position Y, the accelerating switch 65 may be moved successively through a series of positions $a$ to $f$, inclusive, for supplying energy to the motor from the storage batteries. When the vehicle is in operation, the accelerating switch 65 may be moved to occupy positions $k$ and $l$, successively, in which the motor is connected to the batteries for regenerative braking.

The operation of, and circuit connections for, the system are as follows: Assuming that it is desired to charge the batteries 66 and 67, any suitable source of energy is connected to the receptacle 72 and the cut-out switch 64 is moved into position Z, the circuit being established from the receptacle through a conductor 73, contact fingers 74 and 75 (which are bridged by the contact member 76), conductor 77, storage battery 67, conductor 78, motor shunt 79, conductor 80, contact fingers 81 and 82 (which are bridged by contact member 83), conductor 84, battery 66, conductor 85, contact fingers 86 and 87 (which are bridged by contact member 88) and conductor 89 to the opposite terminal of the receptacle 72. The batteries are thus connected in series across the supply circuit.

If it is now desired to forwardly operate the vehicle, the cut-out switch 64 is moved to occupy its position Y and the accelerating switch 65 is moved from its off position $o$ into position $a$. The circuit connections for the system are now represented in the diagram of Fig. 14, storage batteries 66 and 67 being connected in series with its field magnet windings 62 and 63, a portion of the resistance 68 being interposed in circuit between the two field magnet windings. The circuit connections may be traced on the diagram of Fig. 13 as follows: The positive terminal of the battery 66 is now connected through conductor 85 and contact fingers 86 and 92 (which are bridged by contact member 93), conductor 94 and contact finger 95 to contact ring segments 96. The positive terminal of the battery 67 is connected to the same point through conductor 78, shunt 79, conductor 80, contact fingers 81 and 98 (which are bridged by contact member 99), conductor 100 and contact finger 101 which is also in engagement with the ring segment 96. From this ring segment, the circuit is completed through ring segment 102, contact finger 103, conductor 104, motor armature 61, conductor 105, contact fingers 106 and 107 (which are bridged by ring segment 108), conductor 109, field magnet winding 62, conductor 110, contact finger 111, ring segment 112, which is joined to the middle point of resistance 68 by a jumper 113, a section of resistance 68, ring segment 114, jumper 115, segment 116, finger 117, conductor 118, field winding 63, conductor 119 and finger 120 to ring segment 121. From this point, one circuit is completed through a finger 122, conductor 123, fingers 124 and 82 (which are bridged by contact member 125) and conductor 84 to the negative terminal of the battery 66. Another circuit is completed from ring segment 121, through finger 120, conductor 126, fingers 127 and 75 (which are bridged by contact member 128) and conductor 77 to the opposite terminal of the battery 67.

In position $b$, the circuit connections are the same as in position $a$ except that the resistance 68 is short circuited by the ring segment 112 coming into engagement with the ring segments 111 and 117.

In order to make the acceleration of the vehicle motor as gradual and regular as possible, the resistance 70 is connected in shunt circuit to the field magnet windings 62 and 63 instead of changing directly from the circuit connections of position $b$ to those of position $d$, the weakening of the fields in position $c$ serving to give a suitable intermediate operating speed. If the switch 65 is now moved to position $c$, the circuit connections from the positive terminals of the batteries 66 and 67 are the same to the ring segment 108. From this point, three circuit connections are now completed as follows: One through finger 107, conductor 109, field windings 62, conductor 110 and contact finger 111, ring segment 121 and contact finger 120 to conductor 126; a second from ring segment 108 through the jumper 122$^a$, ring segments 123$^a$, contact fingers 117, conductor 118, field 63, conductor 119 and finger 120 to conductor 126; and a third is completed from ring segment 108 through jumper 122$^a$, ring segment 123$^a$, fingers 124$^a$ and resistance 70 to the conductor 126; the main circuit being completed from the conductor 126 to the negative terminals of the batteries.

Figure 17:
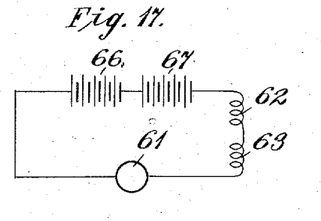
Figure 18:
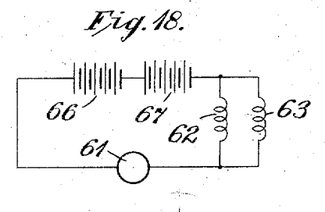
Figure 19:
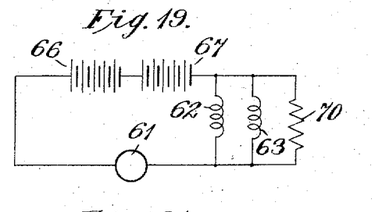

In passing from position $c$ to position $d$, the storage batteries are changed from a multiple circuit arrangement to a series circuit arrangement, as above indicated, and, in order to avoid interrupting the motor circuit, a series of steps are employed in the following sequence. Contact finger 111 comes into engagement with ring segment 129$^a$, contact finger 101 comes into engagement with ring segment 127 and, finally, contact finger 117 comes into engagement with ring segment 129$^a$ and contact finger 122 comes into engagement with ring segment 129. In this way, a circuit is completed when the controller is between the positions $c$ and $d$, from the positive terminal of the battery 67 through conductor 78, contact fingers 81 and 98, conductor 100, contact finger 101, ring segment 127, jumper 128, resistance 69, ring segment 121, finger 122, conductor 123, fingers 124 and 82 and conductor 84 with the negative terminal of the battery 66. Thus it will be observed that the resistance 69 is connected in multiple circuit with the batteries 66 and 67 and, as the controller approaches position $d$, the circuit which respectively connected the positive and the negative terminals of the batteries 66 and 67 together in position $c$, are interrupted by the passing of the contact fingers 101 and 120 out of engagement with the ring segments 96 and 121, respectively. At this point, the resistance 69 is connected in series with two batteries and, finally, as the controller occupies position $d$, the resistance is short circuited by the finger 122 coming into engagement with the ring segment 129. When the controller occupies position $d$, the batteries are connected in series relation and the field magnet windings 62 and 63 are also connected in series as shown in Fig. 17. In the diagram of Fig. 13, a circuit is completed from the positive terminal of the battery 67 through conductor 78, meter shunt 79, conductor 80, contact fingers 81 and 98, conductor 100, finger 101, ring segment 127, jumper 128, ring segment 129, finger 122, conductor 123, fingers 124 and 82 and conductor 84 to the negative terminal of the battery 66. From the positive terminal of this battery a circuit is completed through conductor 85, contact fingers 86 and 92, conductor 94, finger 95, ring segments 96 and 102, finger 103, conductor 104, armature 61, conductor 105, finger 106, segment 108, finger 107, conductor 109, field magnet winding 62, conductor 110, finger 111, ring segment 129$^a$, finger 117, conductor 118, field magnet winding 63, conductors 119 and 126, fingers 127 and 75 and conductor 77 to the negative terminal of the battery 67.

As the controller successively occupies position $e$ and $f$, the field magnet windings 62 and 63, which are connected in series in position $d$, are now connected in multiple circuit, a resistance being introduced across the terminals of the field magnet windings in position $f$ to increase the speed of the motor by still further weakening the fields.

By reference to the diagrams of Figs. 14, 15, 16, 17, 18 and 19, it will be observed that the field magnet winding connections are in series with each other when the controller occupies position $a$, $b$ and $d$ and are in multiple circuit when the controller occupies position c, e and f, the applied voltage being changed by connecting the batteries in multiple circuit in position a, b and c and in series circuit relation in position d, e and f.

Referring to the diagram of Fig. 13, and assuming that the controller occupies position e, from the positive terminal of the battery 67, a circuit connection will be established, as in position d, to ring segment 108, two circuits being continued from this point, one through finger 107, conductor 109, field magnet winding 62, conductor 90, finger 111, segment 130 and finger 120 to conductor 126, and the other from ring segment 108 through jumper 122ª, ring segment 123ª, jumper 130ª and ring segment 131, finger 117, conductor 118, field 63 and conductor 119 to the conductor 126, the circuit being completed from this point as before.

When the controller occupies position f, the circuits are completed as in position e except that finger 124ª comes into engagement with ring segment 131, thereby connecting resistance 70 in multiple circuit with the field magnet windings 62 and 63.

Figure 20:
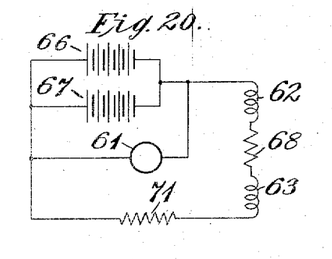
Figure 21:
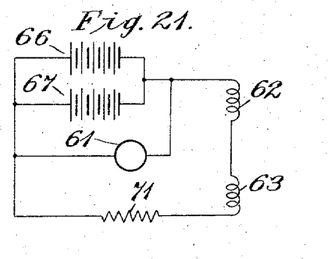

Assuming that the vehicle is in motion and that it is desired to apply the electric brakes, the controller may be moved successively into positions k and l in which the circuit connections are illustrated in Figs. 20 and 21, the resistance 71 being connected in series with the resistance 68 in position k and the resistance 68 being short circuited in position l.

In the diagram of Fig. 13, the controller 65 being in position k, a circuit is established from the positive terminal of the battery 67 to the conductor 100, as above indicated, and from the positive terminal of the battery 66 a circuit is established to the contact finger 95, circuit being continued from this point through a ring segment 132 and contact finger 101 to the conductor 100. The positive terminals of the batteries are jointed at this point and the circuit is continued in two paths, one through resistance 71, contact finger 133, ring segments 134 and 135, finger 107, conductor 109, field magnet winding 62, conductor 110, finger 11, ring segment 137, resistance 68, ring segment 114, finger 117, conductor 118, field magnet winding 63, conductor 119 and finger 120 to the ring segment 140. Another circuit is established from conductor 100 through finger 101, ring segments 132 and 136, finger 103, conductor 104, armature 61, conductor 105, finger 106, segments 138 and jumper 139 to ring segment 140. From the segment 140, circuits are completed through conductors 123 and 126 to the negative terminals of the batteries 66 and 67, as above indicated.

When the controller is moved to position l, the finger 101 moves into engagement with the segment 104 so that the resistance 68 is short circuited.

Assuming that the accelerating switch 65 has been adjusted longitudinally, by means of the handle lever 18, and has been moved from its off position into position a, the circuit connections may be traced on the diagram of Fig. 13 as follows: A circuit is completed from the positive terminal of the battery 66 to the ring segments 96 and a second circuit is completed from the positive terminal of the battery 67 to the same point as indicated in the description of the circuits when the switch occupies position a for a forward rotation. By reason of the longitudinal adjustment of the contact-bearing member of the switch, circuit is completed from the ring segments 96 through contact finger 106, conductor 105, motor armature 61, conductor 104, contact fingers 103 and 107 (which are bridged by ring segments 108), conductor 109, field magnet winding 62 and conductor 110 to contact finger 111, circuit being completed from this point as before. It will thus be observed that the circuits are similarly established but that the armature terminals are so interchanged that the current traverses the armature winding in the opposite direction. This is also true of the other operating positions of the controller and it is, therefore, deemed unnecessary to further trace the circuit connections in each position for the backward operation.

The circuit connections and the arrangement of the control segments and contact fingers are such as have resulted from the practical application of my improved control system to commercial vehicles, and, therefore, constitute a preferred embodiment of my invention, but it will be understood that various modifications in the circuit connections and in the structure of the circuit controllers may be effected within the spirit and scope of my invention, and I desire that only such limitations shall be imposed as are indicated in the appended claims.

I claim as my invention:

1. A controller for electric motors comprising a rotatable shaft, a spider secured thereto and a drum segment of insulating material secured to said spider and having a plurality of contact segments on its outer surface, of a resistance member supported by said spider and electrically connected to said contact segments, and a plurality of stationary contact fingers adapted to engage the contact segments.

2. In a controller for electric motors, the combination with a rotatable shaft, a spider secured thereto, a drum segment of insulating material mounted on said spider, contact segments secured to the drum segment, and stationary contact fingers adapted to cooperate with the segments, of a plurality of rods disposed about the shaft and parallel to it, and a coil of resistance conductor supported by and insulated from said rods and connected to the contact segments.

3. A controller for electric motors comprising a rotatable shaft capable of a limited longitudinal adjustment, a drum segment secured to the shaft, contact segments mounted on said drum segment, and a plurality of stationary contact fingers coöperating with said contact segments for gradually accelerating the electric motor in one direction, as the drum is rotated through a predetermined angle, and for accelerating the motor in the opposite direction when the drum is longitudinally adjusted and rotated through the same angle.

4. A controller for electric motors comprising a rotatable supporting frame, a resistance conductor secured thereto and an insulating drum segment mounted thereon, contact segments secured to the drum segment and stationary contact fingers adapted to coöperate with the contact segments for accelerating the motor when the drum segment is rotated through a predetermined angle and for accelerating the motor in the opposite direction when the drum segment is adjusted longitudinally and rotated through the same angle.

5. A controller for electric motors comprising a rotatable and longitudinally adjustable shaft, a drum switch rotatably mounted thereon, a second drum switch secured to said shaft, interlocking means between the two switches for preventing the adjustment of one except when the other occupies a predetermined position.

6. A controller for electric motors comprising a rotatable and longitudinally adjustable shaft, a metal drum switch rotatably mounted on the shaft, a second drum switch secured to the shaft and means for preventing the longitudinal adjustment of the shaft except when it occupies a predetermined position.

7. A controller for electric motors comprising a rotatable and longitudinally adjustable shaft, a pivotally mounted operating handle, a cut-out switch drum rotatably mounted on the shaft, an accelerating switch drum secured to the shaft and a plurality of stationary contact fingers adapted to coöperate with the switch drum to produce a motor acceleration in one direction when the shaft is rotated through a predetermined angle from its off position and for accelerating the motor in the opposite direction when the shaft is adjusted longitudinally and rotated through the same angle.

8. In a control system for electric vehicles, the combination with an electric motor having an armature and a plurality of field magnet windings, storage batteries for supplying energy to the motor and a charging circuit for the batteries, of a switch for either connecting the batteries to the charging circuit or to the motor circuit, and a control drum switch adapted to occupy a plurality of positions in which the batteries are successively connected in multiple and in series and the field magnet windings are successively connected in series and in multiple.

In testimony whereof, I have hereunto subscribed my name this 30th day of Jan., 1909.

HOWARD L. BEACH.

Witnesses:
 ORIL C. BEACH,
 B. B. HINES.